United States Patent
Nakamura

(10) Patent No.: US 7,005,773 B2
(45) Date of Patent: Feb. 28, 2006

(54) STATOR ARRANGEMENT OF VEHICLE AC GENERATOR

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 188 days.

(21) Appl. No.: 10/241,628

(22) Filed: Sep. 12, 2002

(65) Prior Publication Data

US 2003/0067239 A1    Apr. 10, 2003

(30) Foreign Application Priority Data

Oct. 5, 2001    (JP)    ............................. 2001-309544

(51) Int. Cl.
- *H02K 1/00*    (2006.01)
- *H02K 19/26*    (2006.01)
- *H02K 3/00*    (2006.01)
- *H02K 21/00*    (2006.01)
- *H02K 23/02*    (2006.01)

(52) U.S. Cl. ..................... 310/180; 310/179; 310/184
(58) Field of Classification Search ................ 310/201, 310/180, 179, 184, 42, 254; 29/596
See application file for complete search history.

(56) References Cited

U.S. PATENT DOCUMENTS

| | | | |
|---|---|---|---|
| 1,853,161 A * | 4/1932 | Apple | .......................... 310/201 |
| 6,026,558 A * | 2/2000 | Yoshida et al. | ................ 29/598 |
| 6,181,043 B1 * | 1/2001 | Kusase et al. | ............... 310/201 |
| 6,388,358 B1 * | 5/2002 | Umeda et al. | ............... 310/201 |
| 6,459,177 B1 * | 10/2002 | Nakamura et al. | ............. 310/42 |
| 6,462,453 B1 * | 10/2002 | Asao et al. | .................. 310/179 |
| 6,501,206 B1 * | 12/2002 | Oohashi et al. | .............. 310/184 |
| 6,865,796 B1 * | 3/2005 | Oohashi et al. | ................ 29/596 |
| 2002/0033649 A1 * | 3/2002 | Oohashi et al. | .............. 310/184 |
| 2002/0041129 A1 * | 4/2002 | Oohashi et al. | .............. 310/179 |
| 2003/0024101 A1 * | 2/2003 | Tokizawa et al. | .............. 29/596 |
| 2003/0127934 A1 * | 7/2003 | Koike | ......................... 310/201 |

FOREIGN PATENT DOCUMENTS

| | | |
|---|---|---|
| EP | 0 881 743 A2 | 12/1998 |
| EP | 1 081 830 A2 | 3/2001 |
| JP | A 60-170448 | 9/1985 |
| JP | 11 341730 A | 12/1999 |
| WO | WO 92/06527 | 4/1992 |

* cited by examiner

*Primary Examiner*—Julio C. Gonzalez
(74) *Attorney, Agent, or Firm*—Oliff & Berridge, PLC

(57) ABSTRACT

In a vehicle AC generator, a plurality of conductor segments having connection-ends is connected to form a stator winding. Each pair of the connection-ends is welded to each other side by side to align in a radial direction thereby forming a ring of the connection-ends disposed at equal intervals on an end of the stator core. Each pair of the connection-end has a recessed portion for preventing a welded portion of the connection-ends from swelling out of the recess in the circumferential direction.

6 Claims, 5 Drawing Sheets

STATOR ARRANGEMENT OF VEHICLE AC GENERATOR

CROSS REFERENCE TO RELATED APPLICATION

The present application is based on and claims priority from Japanese Patent Application 2001-309544, filed Oct. 5, 2001, the contents of which are incorporated herein by reference.

BACKGROUND OF THE INVENTION

1. Field of the Invention

The present invention relates to a stator arrangement of a vehicle AC generator that is driven by a vehicle engine.

2. Description of the Related Art

WO92/06527 discloses a stator winding formed of a plurality of conductor segments that are inserted into respective slots of a stator core and welded together at an end of the stator core. JP-A-11-341730 discloses a plurality of conductor segments welded by a TIG (tungsten inert gas) welder or the like. In such a case, a ball-like projection is formed at connection-ends of the conductor segments, as shown in FIG. 8, because of the surface tension of the welded portions. Such a ball-like projection shortens the distance between adjacent connection-ends. Although the conductor segments are usually coated with insulation film, it is removed from the connection-ends in order to ensure sufficient electrical and mechanical connection. Therefore, it is necessary to provide a sufficient insulation space between the adjacent connection-ends to prevent the connection-ends from short-circuiting.

SUMMARY OF THE INVENTION

The present invention has been made in view of the above problems.

It is a main object of the invention to provide a stator arrangement of a vehicle AC generator that is free from short-circuiting.

According to a feature of the invention, a stator includes a plurality of improved conductor segments with connection-ends connected to form a stator winding. Each pair of the connection-end has a recessed portion for preventing a welded portion of the connection-ends from forming a ball-like projection projecting in the circumferential direction.

Therefore, the sufficient insulation distance between adjacent connection-ends can be ensured.

The stator core of the stator may have a plurality of slots disposed in a circumferential direction to accommodate a number of the conductor segments in each slot to form a plurality of rings of said connection-ends.

Preferably, the connection-ends are welded by a laser welder to control welded portion of the conductor segment so that ball-like projection can be prevented from forming at the connection-ends.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle AC generator according to a preferred embodiment of the invention is described with reference to the appended drawings.

Figure 1:
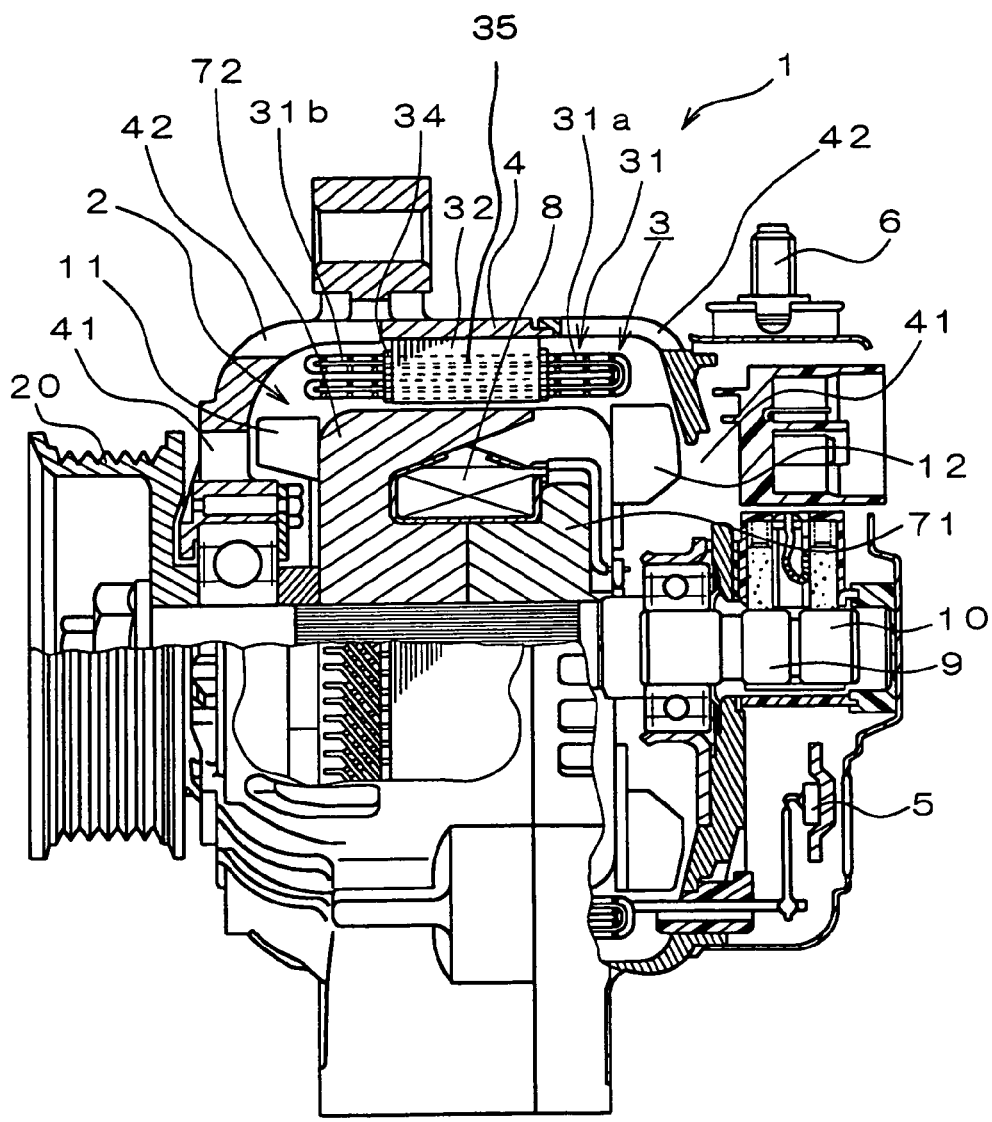
FIG. 1 is a side and a partially cross-sectional view of a vehicle AC generator according to a preferred embodiment of the invention.
Figure 2:
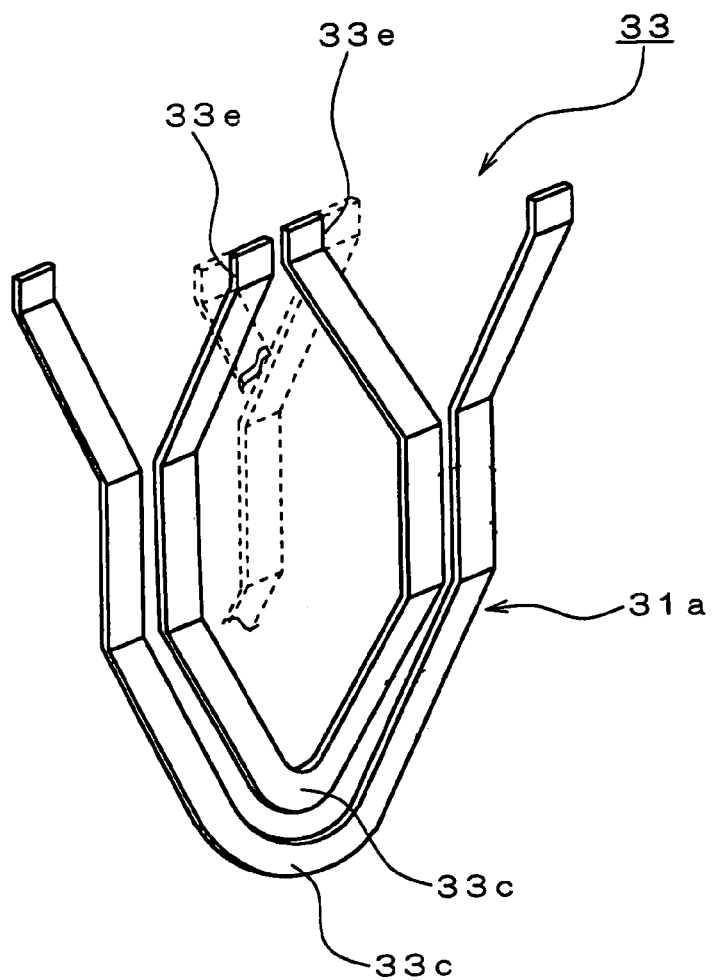
FIG. 2 is a perspective view of a pair of conductor segments to be inserted into a slot of a stator core of the vehicle AC generator shown in FIG. 1.

As shown in FIG. 1, the vehicle AC generator 1 according to a preferred embodiment is comprised of a rotor 2, a stator 3, a frame 4, a rectifier unit 5, a pair of cooling fans 11, 12 and a pulley 20 that is connected to the rotor 2 via a shaft. The rotor 2 includes a field coil 8, a pair of slip rings 9, 10 and a plurality of pairs of pole cores 71, 72. The stator 3 is comprised of a stator core 32 and a stator winding 31, which is mounted in a plurality of slots 35 formed in the inside surface of the stator core 32. The stator winding 31 is formed from a plurality of conductor segments with ends connected together, as shown in FIG. 2.

The rotor 2 of the vehicle AC generator 1 is rotated by an engine via the pulley 20. When field current is supplied to the field coil 8 through the pair of slip rings 9, 10 while the rotor 2 is being rotated by an engine, the pole cores 71, 72 provide a rotating magnetic field to generate AC power in the stator winding 31. The rectifier unit 5 converts the AC power to DC power, which is provided at the output terminal 6 thereof. The pair of cooling fans 11, 12 is rotated together with the rotor 2 to take air into the inside of the frame 4 from an opening 41 formed at an axial end of the frame 4 to cool the stator winding 31 and discharge the same to the outside from an opening formed at an outer peripheral portion of the frame 4.

The stator winding 31 is mounted in the slots 35 with insulators 34. The stator winding 31 is formed of a plurality of pairs of U-shaped conductor segments 33, as shown in FIG. 2. Each of the U-shaped conductor segments 33 has a turn portion 33c that forms a first coil-end 31a of the stator winding at the end of the stator core 32 near the pulley 20 and a pair of connection-ends 33e that forms a second coil-end 31b at the side thereof away from the pulley 20. Two pairs of the connection-ends 33e are extended from each slot 35 to be aligned in the radial direction so that the second coil-ends 31b form double rings.

Figure 3:
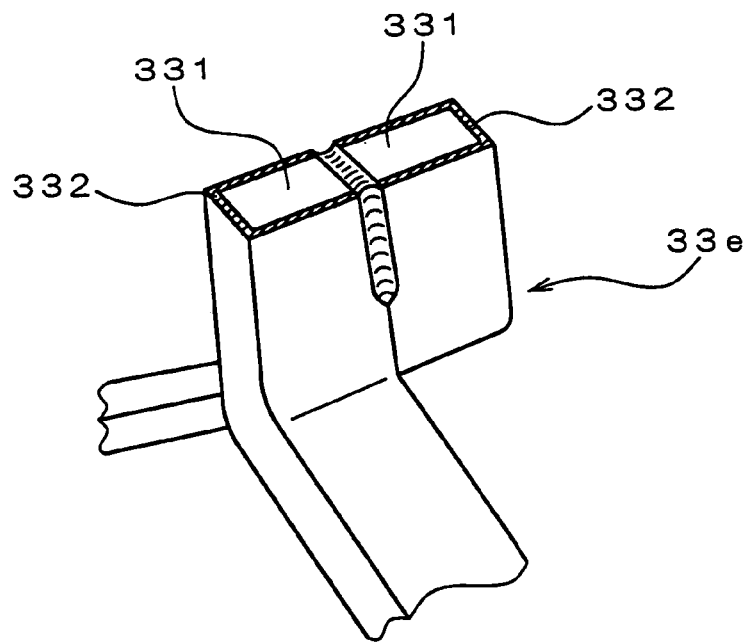
FIG. 3 is an enlarged view of welded connection-ends of a pair of conductor segments of the vehicle AC generator shown in FIG. 1.

The conductor segments 33 are made of a flat copper wire 331 coated with an insulating material 332. The insulating material 332 is removed from contacting surfaces of a pair of the connection-ends 33e to form a recess 331b between the contacting surfaces, as shown in FIG. 3. A laser beam is applied to the contacting surfaces from the bottom of the recess to the top thereof to weld the connection-ends 33e together. The focus of the laser beam is controlled so that melted copper may not swell out of the recess in the circumferential direction due to the surface tension thereof.

The connection ends 33e can be welded by means of blazing under temperature control instead of the laser welding.

Figure 4:
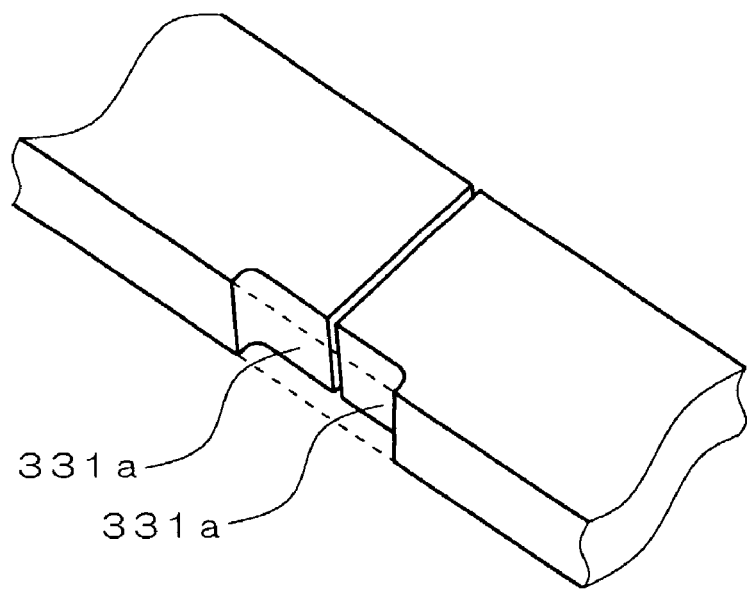
FIG. 4 is a schematic view illustrating a step of forming the connection-end shown in FIG. 3.
Figure 5:
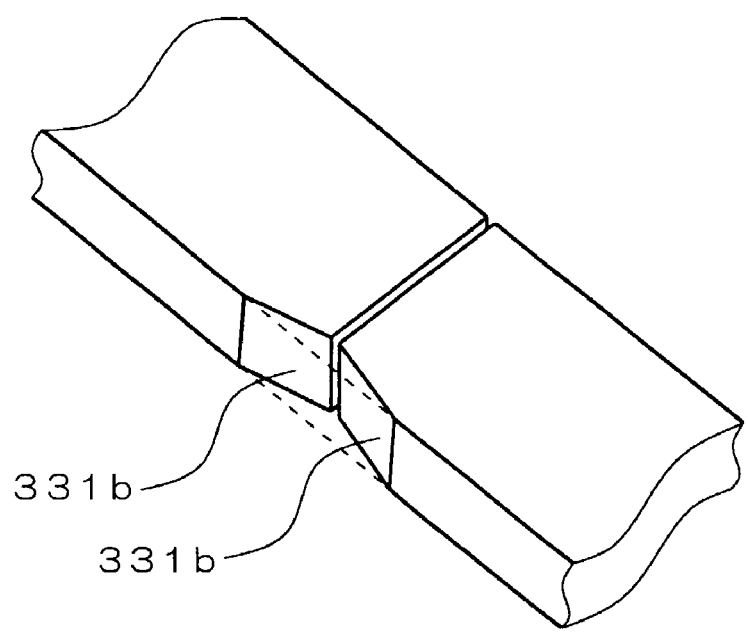
FIG. 5 is a schematic view illustrating a variation of the step of forming the connection-end shown in FIG. 3.

As shown in FIG. 4, a flat-bottomed recess 331a can be formed when a flat type copper wire is cut to form the conductor segments. The shape of the recess may have a sloped bottom, as shown in FIG. 5.

Figure 6:
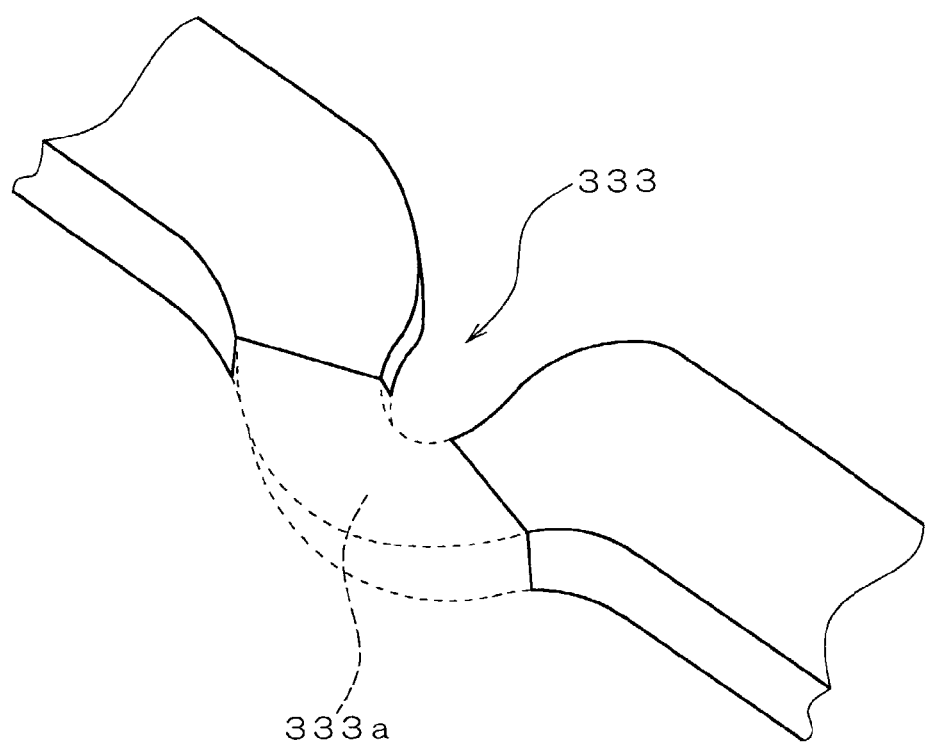
FIG. 6 is a schematic view illustrating another variation of forming the portion of the connection-end shown in FIG. 3.

As another step of forming the recess, a flat type copper wire is bent to form a curved surface 333 that is coated with an insulating material. Thereafter, a bent portion 333a is removed to have the contacting surface without the insulating material, as shown in FIG. 6. In this case, the insulating material coated on the curved surfaces 333 insulates the second coil-ends 31b one from another.

Thus, the second coil-ends 31b do not have any projection or swell that shortens the circumferential distance between the neighboring second coil-ends 31b, so that short-circuiting between the second coil-ends 31b can be surely prevented.

Figure 7:
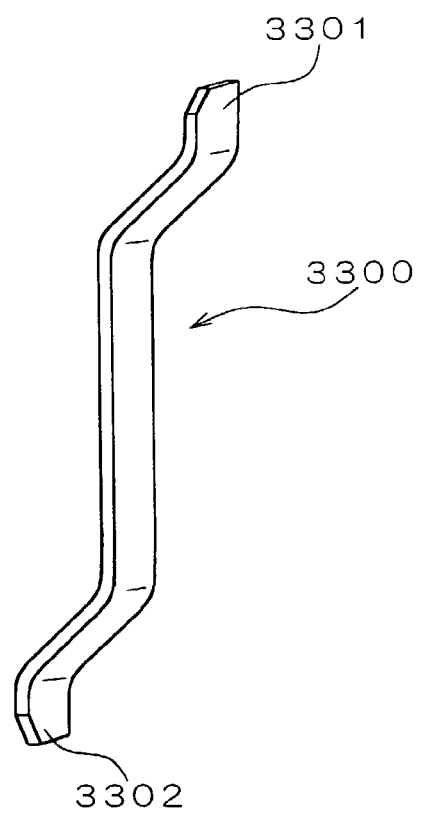
FIG. 7 is a perspective view of another conductor segment.
Figure 8:
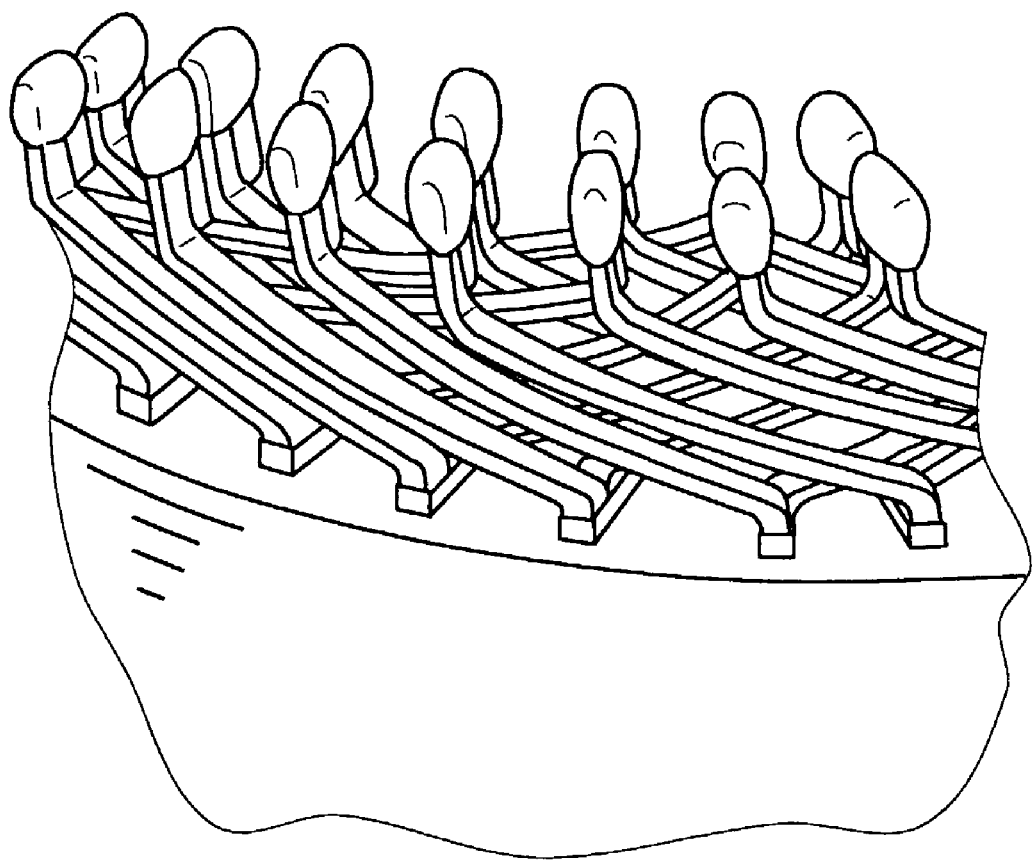
FIG. 8 is a fragmentary perspective view of a prior art stator with a plurality of conductor segments.

The present invention may be applied to a stator winding formed of other type of conductor segments such as I-shaped conductor segments 3300 having a pair of connection portions 3301, 3302 shown in FIG. 7 instead of the U-shaped conductor segments 33.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle AC generator, comprising:
   a rotor;
   a stator including a stator core, a plurality of conductor segments with connection-ends connected to form a stator winding, each pair of said connection-ends being welded to each other side by side without solder to align in a radial direction thereby forming a ring of said connection-ends disposed at equal intervals on an end of said stator core; and
   a frame for supporting said rotor and said stator,
   wherein each pair of said connection-ends has a bottomed recess inside thereof for accommodating a welded portion of said connection-ends therein so that the welded portion can be prevented from swelling out of said bottomed recess in the circumferential direction of said stator core when said connection ends are welded.

2. The vehicle AC generator as claimed in claim 1, wherein said stator core has a plurality of slots disposed in a circumferential direction of said stator core for accommodating a number of said conductor segments in each slot to form a plurality of rings of said connection-ends.

3. The vehicle AC generator as claimed in claim 1, wherein said welded portion of connection-ends is formed by a laser welder.

4. The vehicle AC generator as claimed in claim 1, wherein
   said welded portion of connection-ends is formed by brazing.

5. The vehicle AC generator as claimed in claim 1, wherein each of said conductor segments is made of a flat type copper wire which is coated with an insulation material except contacting surfaces of said connection-ends.

6. The vehicle AC generator as claimed in claim 2, wherein each pair of said connection-ends has no swelling portion in the axial direction of said stator core.

* * * * *